(12) United States Patent
Carmichael et al.

(10) Patent No.: US 6,240,545 B1
(45) Date of Patent: *May 29, 2001

(54) SETTING INSTANCE BREAKPOINTS IN OBJECT ORIENTED COMPUTER PROGRAMS

(75) Inventors: Ian Hugh Carmichael; Eduardus Antonius Theodorus Merks, both of Ontario (CA); David Paul Olshefski, Danbury, CT (US); Mike Wulkan, Ontario (CA)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,858

(22) Filed: Apr. 27, 1998

(30) Foreign Application Priority Data

Jul. 25, 1997 (CA) .................................................. 2211505

(51) Int. Cl.$^7$ ...................................................... G06F 9/45
(52) U.S. Cl. ...................................................... 717/4; 717/5
(58) Field of Search ................................... 395/704, 705; 717/4

(56) References Cited

U.S. PATENT DOCUMENTS

| | | | |
|---|---|---|---|
| 5,093,914 | * 3/1992 | Coplien et al. | 717/4 |
| 5,560,009 | * 9/1996 | Lenkov et al. | 717/4 |
| 5,740,440 | * 4/1998 | West | 717/4 |
| 5,764,989 | * 6/1998 | Gustafsson et al. | 717/4 |
| 5,778,230 | * 7/1998 | Wimble et al. | 717/4 |
| 5,812,850 | * 9/1998 | Wimble | 717/4 |
| 5,845,125 | * 12/1998 | Nishimura et al. | 717/4 |
| 5,848,274 | * 12/1998 | Hamby et al. | 717/5 |
| 5,854,931 | * 12/1998 | Jones et al. | 717/5 |

OTHER PUBLICATIONS

Aho et al.: Compilers: Principles, Techniques, and Tools. Reading, MA, Addison–Wesley Publishing Company, Chapter 10, pp 703–711, Sep. 1985.*

Rosenberg, J.; How Debuggers Work: Algorithms, Data Structures, and Architecture. Canada, John Wiley and Sons, Incorporated, Chapter 6, pp 107–133, Sep. 1996.*

Copperman, M.; "Debugging Optimized Code Without Being Misled". ACM Digital Library[online], ACM Transactions on Programming Languages and Systems, vol. 16, Iss 3, pp. 387–427, May 1994.*

(List continued on next page.)

Primary Examiner—James P. Trammell
Assistant Examiner—Kelvin Booker
(74) Attorney, Agent, or Firm—Scully, Scott, Murphy & Presser; Casey P. August

(57) ABSTRACT

A mechanism for setting a conditional breakpoint on all methods called by a specific instance of a class. To set the instance breakpoint, the debugger determines all of the methods that can be applied to the object type or class. In an environment in which full debugging information includes the correspondence between virtual function tables and specific classes, and full class hierarchy information, the methods are located by locating the pointer to the type's virtual function table, and from the virtual function table, locating the specific class in the debugging information. Identifying the specific type permits all of the base classes of the type to be identified in the debugging information, and from the class hierarchy information, all methods for objects of the type can be compiled. The debugger then sets a conditional breakpoint on each method, the condition specifying that the breakpoint should cause program execution to automatically stop only if the method is being called for the particular object or instance for which the instance breakpoint was set.

10 Claims, 3 Drawing Sheets

OTHER PUBLICATIONS

Wahl et al.; "A Dynamic Very High Level Debugger For Low Level Microprograms". ACM Digital Library[online], Proceedings of the 19th Annual Workshop on Microprogramming, pp 148–155, Oct. 1986.*

Koch et al.; "Debugging of Behavioral VHDL Specifications by Source Level Emulation". ACM Digital Library[online], Proceedings of European Design Automation Conference, pp 256–261, Sep. 1995.*

* cited by examiner

SETTING INSTANCE BREAKPOINTS IN OBJECT ORIENTED COMPUTER PROGRAMS

BACKGROUND OF THE INVENTION

1. Technical Field

The present invention relates to techniques for debugging computer programs, particularly in the field of object oriented (OO) technology.

2. Prior Art

Debuggers are software tools that can be used to diagnose computer programs and trace errors that arise during execution of the program. To support the debugger, information describing symbols and types in the program as well as information to map between source lines and the binary code is required. In the case of compiled programs, the compiler, under the control of an option, can produce this information. This extra information, generally referred to as debugging information, enables the programmer to examine the types, variables and data structures by name and to follow the execution of the program through the source code.

A number of debugging techniques can be used to enable the programmer to properly analyze a program to detect points in the program where errors occur. One such technique is to put a breakpoint into the program, a point in the program where normal operation is suspended automatically when certain conditions are met. Breakpoints are useful for program testing. They are specified by programmers so that interim results of processing can be inspected, and then the program can be restarted to continue running normally.

In traditional debuggers, breakpoints are generally set on functions or methods; program execution is suspended each time the particular function is called. This technique is very useful for traditional procedural languages which are, themselves, function-based.

However, object oriented languages are based on quite a different concept. Programs are created using a set of language tools, abstractions and constructs that support a particular form of user-defined types called "classes". Each such type associates the collection of declared data with a set of operations on that data, that is, methods are called on the data. Variables, or instances, of such types in the running programs are called objects.

A fundamental feature of object oriented programming is that classes can be related to one another by inheritance. The properties, behaviors, data and operations of a parent, or "base", class may be inherited without modification by some child, or "derived", class, or the behavior, properties and operations may be selectively refined under the control of the programmer in the derived class. The latter function is generally referred to as overriding. The function name remains the same, but the changed or overridden function operates on a different type. When defining a derived class, one may start by building on an existing base class which is similar to the one to be created. The derived class inherits the implementation and behavior of the base class, including its functions, except as modified by overriding amendments detailed in the derived class definition. Several classes can inherit the behaviors of a common parent, and a derived class may inherit from more than one base class.

Thus, in object oriented programs, each object defines an independent unit, and methods are called on the object. When an object becomes corrupted or otherwise mutates into a bad state, it can typically be assumed that this is caused by some method called on the object. The debugging issue, then, is to determine which method called on the object is causing the problem. Using a traditional debugger, an immense amount of superfluous information may be gathered, adding unnecessary complexity. This is because the methods that may be called for one object may also be called on any other object of the same class or type. (The construction of an object in memory is discussed in further detail below). In a normal program, thousands of instances of the class may be created in a running program. A breakpoint set on a method, then, will cause program execution to stop at each instance of the class by the method, both at the particular object being investigated and at all other instances in the class.

The continued emphasis in traditional debuggers on procedural debugging fails to take advantage of object oriented design.

SUMMARY OF THE INVENTION

It is therefore an object of the present invention to provide a debugger specifically designed to operate in an object oriented programming environment, and to take advantage of OO hierarchial structure to produce a minimal amount of debugging information appropriate to the conditions set for the debugging operation.

Accordingly, the present invention provides a program debugger for use in an object oriented programming environment that includes a persistent program representation containing the correspondence between virtual function tables and specific classes, and full class hierarchy information. The debugger has means for locating all methods applicable by a type. Preferably, these means include means for identifying all base classes for the type in the persistent program representation, such as by tracing the type in the persistent program representation through its virtual function table, and means for identifying all methods in the base classes and the type in the persistent program representation. The debugger also includes means for setting a breakpoint on the methods to suspend program execution when any of the methods is called by a first instance of the type, such as by comparing the values of the base class cast pointers with a pointer in the method when the method is called.

The invention also provides a method for setting an instance breakpoint in an object oriented program in a programming environment that includes a persistent program representation containing the correspondence between virtual function tables and specific classes, and full class hierarchy information. The method consists of locating all methods applicable by a type, and setting a breakpoint on the methods to suspend program execution when any of the methods is called by a first instance of the type. Preferably, the step of locating all methods consists of identifying all base classes for the type in the persistent program representation and identifying all methods in the base classes and the type in the persistent program representation. Preferably, the step of setting a breakpoint consists of evaluating a cast pointer for each of the base classes for the type and adding to each of the methods: 1) an expression to cause comparison of values of each cast pointer and a pointer in the method when the method is called, and 2) means to suspend program execution when the values are the same.

BRIEF DESCRIPTION OF THE DRAWINGS

Preferred embodiments of the present invention will now be described, by way of example only, with reference to the accompanying drawings, in which:

FIG. 3 schematically illustrates a view of an object in a debugger window.

DETAILED DESCRIPTION OF THE PREFERRED EMBODIMENTS OF THE INVENTION

In order to set breakpoints on procedures limited to a particular instance, the debugger must first:

1. determine all of the methods that can applied to that type of object; and
2. be able to write a condition so that the breakpoint applied to each method will only stop program execution when that method is called on a particular object.

Figure 1:
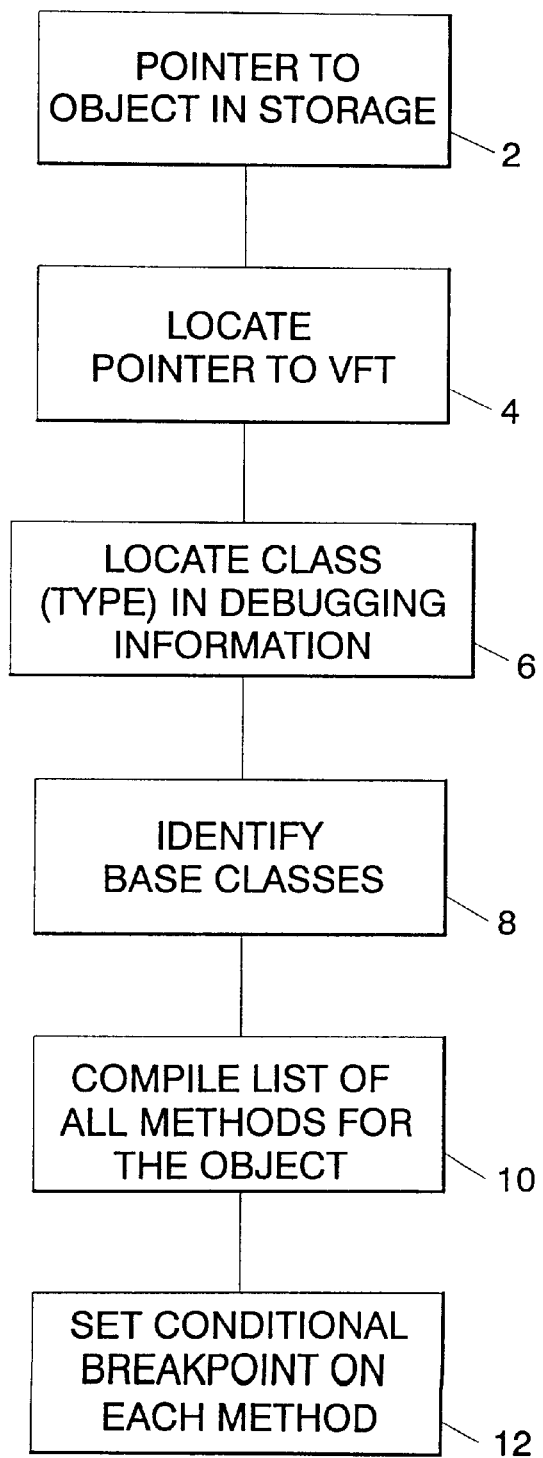
FIG. 1 is a flow diagram illustrating the method for setting an instant breakpoint according to the preferred embodiment of the invention.

This is done by following the method steps illustrated in FIG. 1. From a pointer to the object in storage (block 2), a pointer to an object type's corresponding virtual function table can be located (block 4).

A virtual function is a function with the added property that the specific identity of the virtual function, when invoked by name, is to be determined at execution time as a function of the type of object with which it is associated. This is in contrast to member functions that are not virtual functions and whose specific identity, when invoked by name, is determined at compile time as a function of the declared type of the variable used to access the object. C++ is one OO language which makes extensive use of virtual functions.

Calls to virtual functions can be implemented as indirect calls through a virtual function table created by the compiler for each user-defined class or type whose implementations requires such a table. The virtual function table for a class contains addresses of the virtual function members that are to be invoked at execution time when the class is the type of the object that is the primary operand of the function.

Each class with a virtual function member has an associated virtual function table, and this information is used to locate the specific class for the virtual function table in the debugging information (block 6). Where the accompanying debugging information includes all of the class hierarchy information, identifying the specific type permits all of the base classes for the class to be identified in the debug information (block 8). From this, the list of all the methods for the object can be compiled (block 10).

The debugger then sets a conditional breakpoint on each method (block 12). The condition must specify that the breakpoint should cause execution to stop only if the method is being called for the particular object for which the instance breakpoint was set.

One simple technique is to generate an expression that compares the method's "this" pointer to the address of the object:

*this==(Class\*)OX1234ABCD*

However, in the preferred embodiment, in a technique referred to as "upcasting" the debugger determines the value of the cast pointer (Base Class\*)OX1234ABCD for each base class of Class and creates a condition that compares the value with the value of the machine register that contains the "this" pointer when a method is called. This technique is logically equivalent to the above-described technique of generating a C++ expression, but is considerably more efficient.

Figure 2:
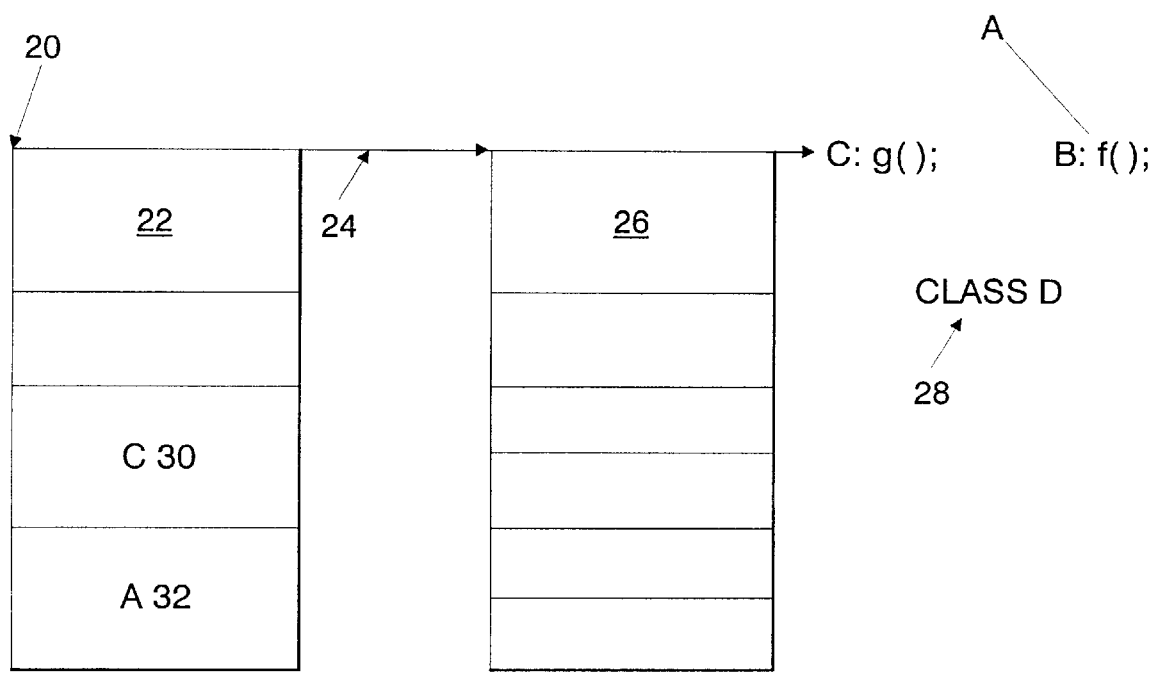
FIG. 2 schematically illustrates the steps set out in FIG. 1 for identifying the methods that can be applied to a given object.

FIG. 2 illustrates schematically the relationship between the different areas of memory described above, and how information is obtained from them, according to the preferred embodiment of the invention.

The object 20 is constructed in dynamic memory during program execution. Every time such an object is created, a series of constructors are invoked. This process is referred to as the invocation chain. Briefly, once space for a newly allocation object is reserved on the heap or stack, its constructor is called. This will be the constructor defined for the deepest level of inheritance, that is the actual class for this type. Because C++ specifies that base class constructors be executed before derived class constructors are executed, this class constructor will immediately call the constructor for its base class or classes (at the second deepest level of inheritance) before execution. A called base class will in turn immediately call its own base constructor(s), and so on. Finally the constructor for the original parent class will be called. Once it finishes and returns, the constructor that called it will perform its construction duties (which may involve calling constructors from member objects), and will then return the constructor that called it. This continues until the first constructor is allowed to do its construction. It is because of the invocation chain, the use of constructors for the object's own class as well as for all base classes, that methods are associated with all instances for the class.

One of the items stored in the constructed object 22 is a pointer 24 to the virtual function table 26 for the object class. From having a pointer 20 to the object, then, a pointer 24 to the virtual function table 26 can be obtained, and with that information, it can be determined that the virtual function table 26 is for a specific class.

In the preferred embodiment of the invention, a database containing a persistent representation constructed by the compiler during parsing provides the following information:

1. the correspondence between virtual function tables and specific classes; and
2. full class hierarchy information.

While constructed for a different purpose (that which is described in Canadian Patent Application Serial No. 2,175, 711 filed May 1, 1997), this program representation is used in the preferred embodiment as the means to identify all of the methods that can be applied to the object.

The debugger of the preferred embodiment allows an object to be dynamically downcast to its concrete type. This means that if the pointer 20 to object 22 is of type Class A, a base class, and that base class contains virtual methods, it can be determined if the pointed to object 22 is really of type D, a class derived from A. This ensures that setting an instance breakpoint will really set breakpoints on all methods that can be called on the instance.

The persistent program representation 28 illustrated in FIG. 2 shows that the virtual function table 26 is for the specific class D. This means that object 22 is of type D.

Further, illustrated in the program representation 28, class D is a derived class and has a number of base classes A, B and C. These in turn contain functions f( ); and g( );. In this simple example, f( ); and g( ); comprise the list of all functions that can be possibly be called on object 22.

If the true concrete class of an instance could not be determined, an instance breakpoint could be set on the set of methods determined from the instance's statically determined class. However, such a breakpoint is likely to miss some method calls on the instance.

The manner in which the breakpoint is set on the located methods is illustrated using the following simple code example.

```
Line 1:     class A
     2:     {
     3:         int foo( ) {return 10;}
     4:         int __a;
     5:     };
     6:     class B:public A
     7:     {
     8:         int goo( ) {return 20;}
     9:         int __b;
    10:     };
    11:     int main( )
    12:     {
    13:         B b;
    14:         B *bb = new B;
    15:         return b.foo( ) + b.goo( )+
    16:         bb → foo ( ) + bb → goo ( );
    17:     }
```

Figure 3:
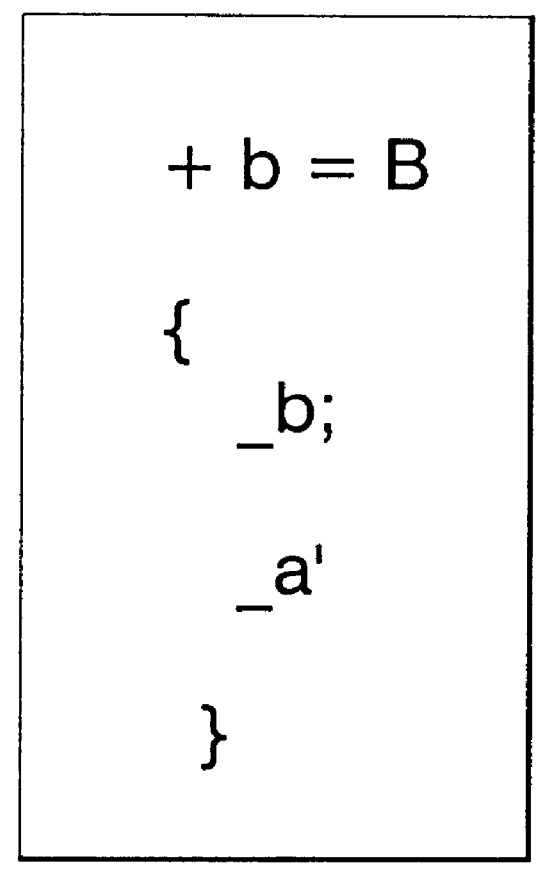

In a program like this, the debugger would stop after the first executable line, line 13. At this point, the user would get a view of b, as illustrated in FIG. 3, that showed that b had a field__b and a field__a in it. If the instance breakpoint is set on this value of b, then execution in the program will stop twice, once on the call b.foo ( ) and once on the call b.goo ( ). It will not stop on either of the calls bb→foo( ) or bb→goo( ) because these are calls on the bb object on which the user has not set an instance breakpoint, even though the same methods are called.

Compare the foregoing with the traditional debugger approach. In this approach it is determined that the class of b is B, which is derived from A. The list of all methods includes inherited method foo( ). If a breakpoint is set on each of these methods, then program execution would stop four times, at the calls on the bb object as well as the calls on the b object.

In order to set a breakpoint in goo( ) in a traditional debugger that would only stop for invocations of goo( ) on b, the programmer would have to add a test comparing the address of b's "this" pointer inside method goo( ). The problem is that b is visible in the goo( ) function, but is not visible in the foo( ) function because the latter is in a base class. Instead, the user would have to fill in a hexadecimal number representing b's address in a test added on foo( ).

With the pointers which are passed into the methods, depending on how the inheritance is structured, base objects may really be parts inside object 22. For example there could be a C part 30 and an A part 32 inside object 22. Because of this, user must be able to compute the correct offsets to know that with a particular function, the value may actual be offset from the original value, the start of the object. It is important to only stop in the correct places. The problem arises where the point to b's address gets adjusted to a different part of the object, as can happen in the case of multiple inheritance.

The preferred embodiment has been described in association with the compiled OO language called C++. One aspect of the preferred embodiment takes advantage of certain information (a program representation) gathered by an enhancer compiler, although, as noted, the same persistent program representation information could be provided separately in the debugging information associated with the instance's class library.

Other OO languages are interpreted, not compiled, or are only partially compiled. Interpreted languages typically use a virtual machine to process source code or partially pre-compiled source code to calls to base functions or "primitive values" resident in the virtual machine. Examples of interpreted OO languages are Smalltalk and Java.

With little modification that would be obvious to the person skilled in the art, the present invention could be adapted for use in suitable debuggers designed for such interpreted OO language programs, as well as other compiled OO languages.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by letters patent is:

1. A program debugger, for use in an object oriented programming environment including a persistent program representation containing the correspondence between virtual function tables and specific classes, and full class hierarchy information, comprising:

means for locating all virtual and non-virtual methods applicable by a type in response to a programmer's specification of a first instance of the type; and means for setting a breakpoint on the methods to suspend program execution when any of the methods is called by the first instance of the type.

2. A program debugger, according to claim 1, wherein the means for locating all methods comprises:

means for identifying all base classes for the type in the persistent program representation; and means for identifying all methods in the base classes and the type in the persistent program representation.

3. A program debugger, according to claim 2, wherein the means for identifying all base classes for the type comprises:

means for locating a virtual function table for the type: and means for tracing the type in the persistent program representation from the virtual function table.

4. A program debugger, according to claim 2, wherein the means for setting a breakpoint comprises:

means to evaluate a cast pointer for each of the base classes for the type; and means to add to each of the methods i) an expression to cause comparison of values of each cast pointer and a pointer in the method when the method is called, and ii) means to suspend program execution when the values are the same.

5. A program debugger, according to claim 1, wherein the means for setting a breakpoint comprise means to add to each of the methods:

means to compare values for a pointer in the method with an address for the instance when the method is called; and means to suspend program execution when the values are the same.

6. A method for setting an instance breakpoint in an object oriented program in a programming environment including a persistent program representation containing the correspondence between virtual function tables and specific classes, and full class hierarchy information, the method comprising:

locating all virtual and non-virtual methods applicable by a type in response to a programmer's specification of a first instance of the type; and setting a breakpoint on the methods to suspend program execution when any of the methods is called by the first instance of the type.

7. The method, according to claim 6, wherein the step of locating all methods comprises:

identifying all base classes for the type in the persistent program representation; and identifying all methods in the base classes and the type in the persistent program representation.

8. The method, according to claim 7, wherein the step of identifying all base classes for the type comprises:

locating a virtual function table for the type; and tracing the type in the persistent program representation from the virtual function table.

9. The method, according to claim 7, wherein the step of setting a breakpoint comprises:

evaluating a cast pointer for each of the base classes for the type; and adding to each of the methods i) an expression to cause comparison of values of each cast pointer and a pointer in the method when the method is called, and ii) means to suspend program execution when the values are the same.

10. The method, according to claim 6, wherein the step of setting a breakpoint comprises adding to each of the methods:

means to compare values for a pointer in the method with an address for the instance when the method is called; and means to suspend program execution when the values are the same.

* * * * *